April 21, 1964
N. C. WILLIAMS
3,129,511
CONTROL SYSTEM
Filed Dec. 20, 1960
3 Sheets-Sheet 1
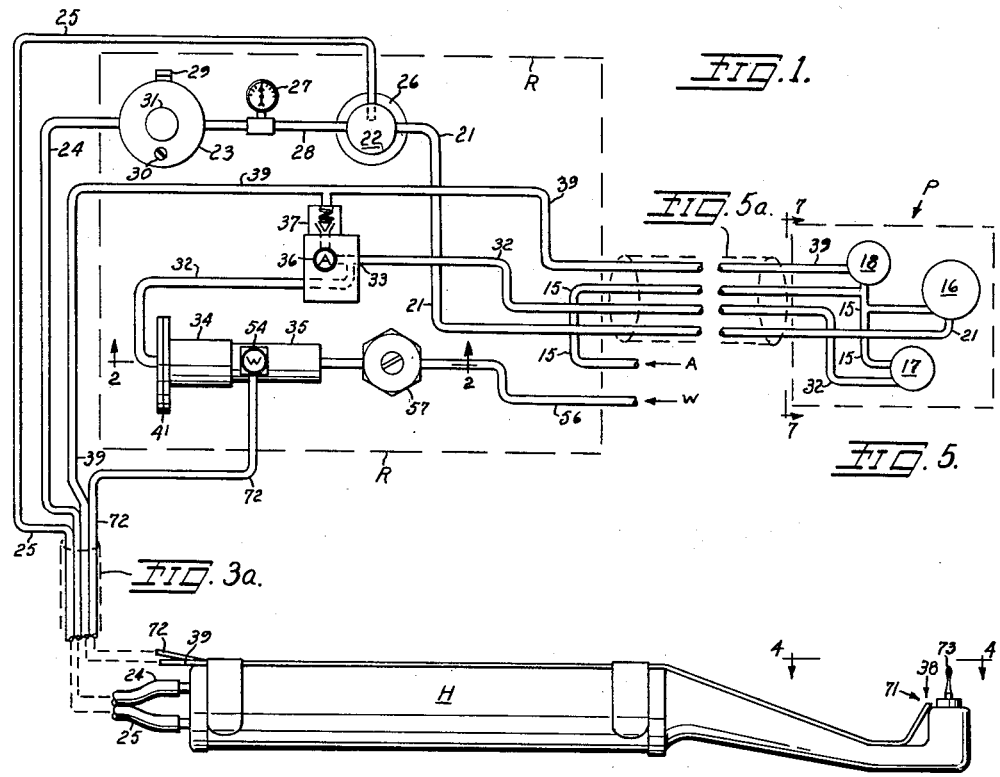
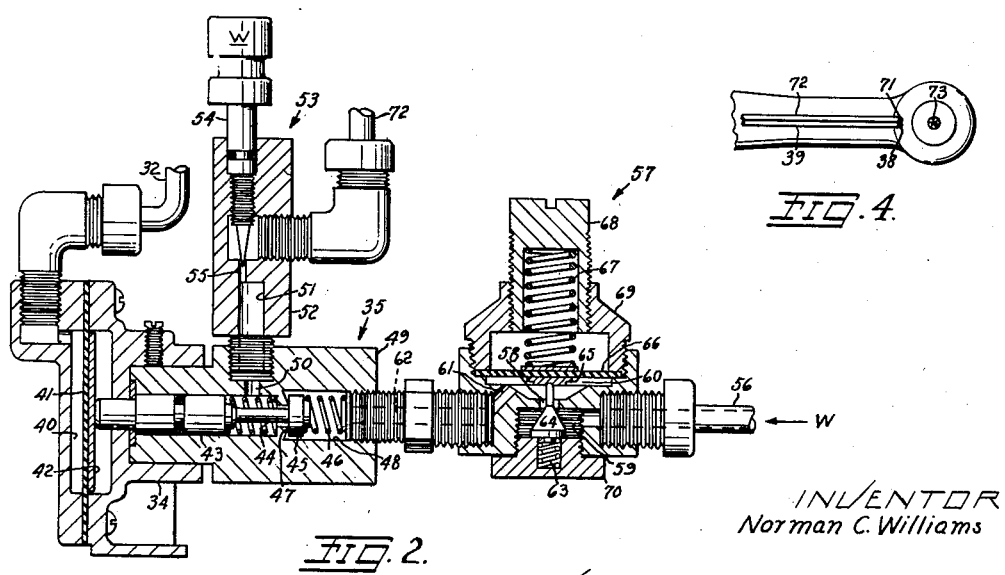
INVENTOR
Norman C. Williams
BY
AGENT

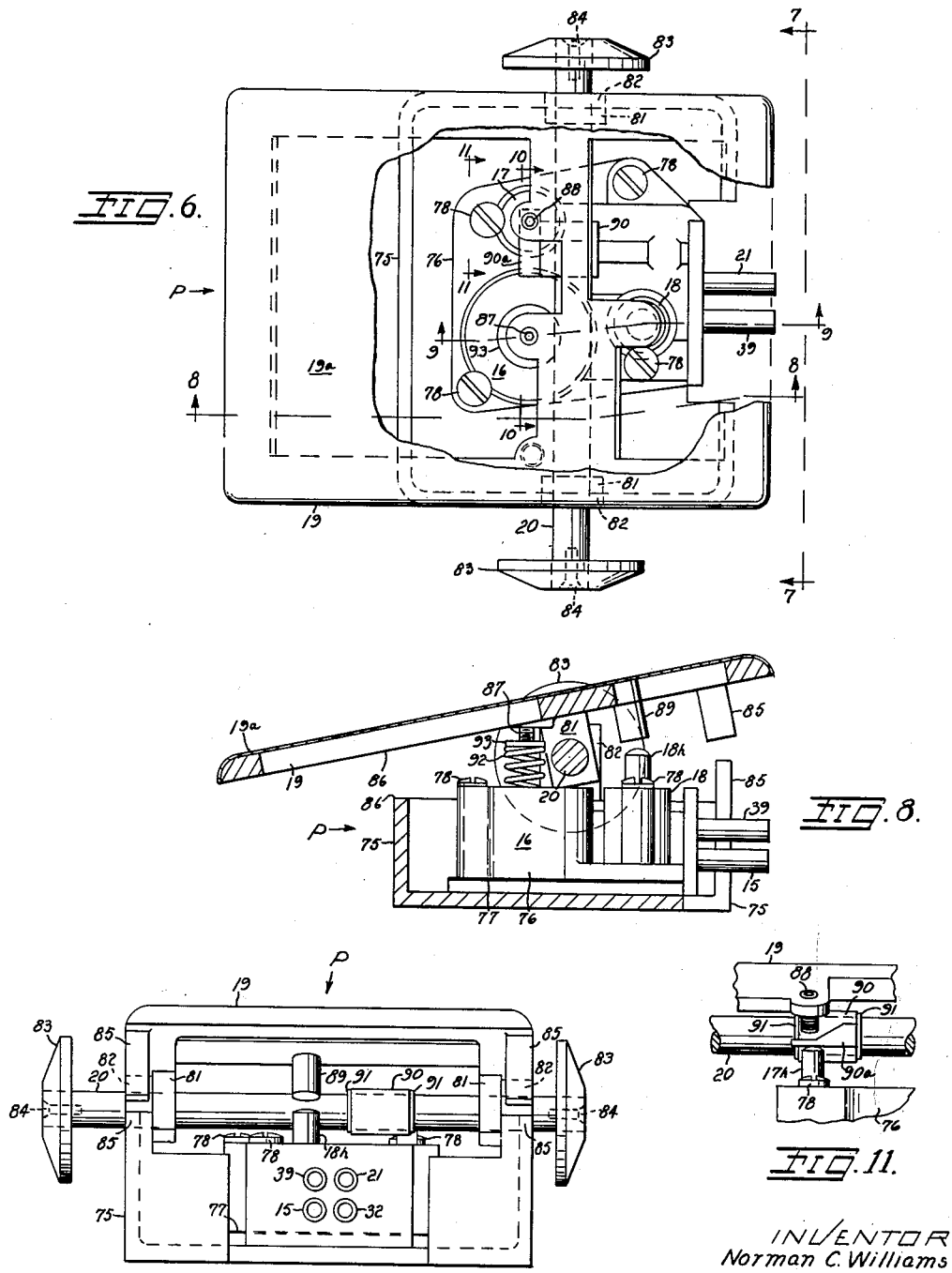

April 21, 1964     N. C. WILLIAMS     3,129,511
CONTROL SYSTEM

Filed Dec. 20, 1960     3 Sheets-Sheet 3

INVENTOR
Norman C. Williams

BY

AGENT

United States Patent Office 3,129,511
Patented Apr. 21, 1964

3,129,511
CONTROL SYSTEM
Norman C. Williams, Portland, Oreg., assignor to Power Brake Equipment Company, a corporation of Oregon
Filed Dec. 20, 1960, Ser. No. 77,082
7 Claims. (Cl. 32—28)

This application is a continuation in part of my copending application S.N. 760,754, filed September 12, 1958, for a U.S. patent on my invention of a Control System for an ultra high speed air turbine driven dental drill requiring water cooling of the drill and the dental material being drilled.

It is the principal object of the present invention, here first disclosed, to provide an improved control system including pedal operated means for modulating the speed of an ultra high speed air turbine driven dental drill together with means for applying air and/or water under pressure, individually or simultaneously, to the tooth area being drilled to cool the drill and keep the drilling area clear of drilling chips and sludge.

It is a second object to provide such a system with a first pedal operated air pressure modulating means for receiving air from a source of air under pressure, limiting the pressure above atmosphere of said air as desired in response to the movement of said pedal in one of its two directions from its position of rest and delivering said air to said turbine to modulate the speed of said turbine in response to the pressure of said air.

It is a third object to provide such a system with a second means operable by said pedal on movement in said one direction to apply a jet of water at a selected pressure to said drilling area.

It is a fourth object to provide such a system with a third means operable by said pedal on movement in said one direction to apply a jet of air at a selected pressure to said drilling area.

It is a fifth object to provide such a system with means for combining said second means with said third means to provide a mist of air pressure atomized water to said drilling area.

It is a sixth object to provide such a system with an individual means for pre-setting the rate of flow of said air jet.

It is a seventh object to provide such a system with an individual means for pre-setting the rate of flow of said water jet.

It is an eighth object to provide such a system with adjustable means operable to preset a desired time delay of operation of said second means and said third means by said pedal after the operation of said first means by said pedal on movement thereof in said one direction.

It is a ninth object to provide such a system with additional means operable by said pedal on movement in its other direction from its position of rest to apply one of said jets at a selected pressure to said drilling area without actuating said turbine.

How these and other objects are attained is made plain in the following description referring to the attached drawing in which:

FIG. 1 shows in schematic plan within the dotted rectangle, R, those elements of my system which can be remotely conveniently assembled for effective operation.

FIG. 2 is a fragmental vertical view in partial section along the line 2—2 of FIG. 1.

FIG. 3 is a side view of the hand piece, H, used with this invention together with the air-water vaporizing device forming a part thereof.

FIG. 3a shows within a dotted transparent tube how the air and water conduits connect the handpiece of FIG. 3 with the remote assembly, R, of FIG. 1.

FIG. 4 is a fragmental view of the handpiece from the line 4—4 of FIG. 3.

FIG. 5 shows in schematic plan within the dotted rectangle, P, the floor positioned pedal operated control valves of my system.

FIG. 5a shows within a dotted transparent tube how the air conduits connecting the pedal operated control valves of the assembly, P, of FIG. 5 are connected with the remote assembly, R, of FIG. 1.

FIG. 6 is a fragmental plan view of the pedal operated air valve mechanism, P, of FIG. 5, reversed end for end.

FIG. 7 is a fragmental end elevation viewed from the lines 7—7, FIGS. 5 and 6.

FIG. 8 is a fragmental side elevation as viewed from the line 8—8 of FIG. 6.

FIG. 11 is a fragmental end elevation as viewed from the line 11—11 of FIG. 6.

Like reference numerals refer to like parts in the several figures of the drawing.

Figure 9:
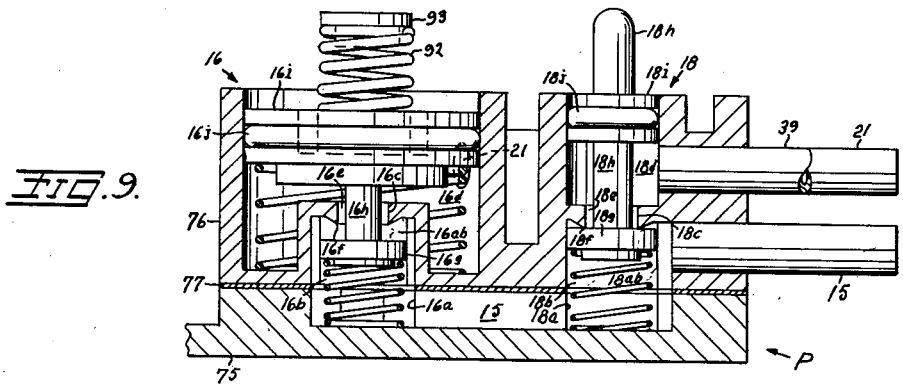
FIG. 9 is a fragmental side elevation in partial section as viewed from the line 9—9 of FIG. 6.

Referring now to the schematic arrangement of FIGS. 1, 3, 3a, 4, 5, 5a, it is noted that air under pressure is received from a source thereof at the remote R group of elements by the A end of conduit 15 which through tube bundle 5a leads to the P group of elements and becomes air manifold 15 feeding air pressure modulating turbine speed control valve 16, atomizer air control valve 17, and tooth drying air control valve 18.

When turbine speed control valve 16 is actuated by counterclockwise rotation of pedal 19, about its axle 20, see FIG. 8, air under pressure is passed from manifold 15 to the air turbine, not shown, for driving drill 73 in handpiece H, through air conduit 21, air filter 22, air oiler 23 and conduit 24. From the turbine the oiled air is exhausted to atmosphere from the handpiece H through conduit 25 to blotter-lined open tray 26 located under air filter 22 and positioned also to receive any small amount of moisture taken from the air by the filter. An air pressure gage 27 is connected in line 28 between filter 22 and oiler 23 to be in full view of the dentist to show the air pressure on the turbine and thereby its approximate speed.

The oiler 23 has an oil filling opening 29, an oil drop feed control screw 30 and a transparent oil drop chamber cover 31 for observation of the rate of oil drop into the air stream. A satisfactory oiler for the purpose is the Norgren 10AGIL Micro-Fog Lubricator supplied by C. A. Norgren Co., Englewood, Colorado.

When turbine speed control valve 16 is actuated by pedal 19 atomizer air control valve 17 is also opened to pass air under pressure to air conduit 32 which divides at 33 to pass actuating air to diaphragm operator 34 for water valve assembly 35 and to pass water atomizing air through manually operated air control valve 36 and check valve 37 to water atomizing air jet 38 of hand piece H through air conduit 39.

When pedal 19 opens air control valve 17, as just described, air passes through conduit 32 into diaphragm chamber 40 of operator 34, see FIGS. 1 and 2, of water valve assembly 35 and the air pressure in chamber 40 causes diaphragm 41 and disk 42 to move operating stem 43 against its return spring 44 and lift water valve 45 against its return spring 46 from its seat 47 to permit water from inlet valve chamber 48 in body 49 to pass to outlet valve chamber 50 and inlet chamber 51 of body 52 of needle valve 53 of which the valve needle 54 is threaded into body 52 to be adjustably positioned in inlet port 55 to set the rate of water flow from the source of water under pressure at the inlet W of water conduit 56 through water pressure regulator 57 to the inlet valve chamber 48 of water valve assembly 35.

Water pressure regulator 57 receives water through conduit 56 into valve inlet chamber 59 and through valve port 58 into outlet chamber 60 which includes conduits 61, 62 and inlet valve chamber 48 in body 49 of valve assembly 35.

Positioning spring 63 of conical water pressure regulating valve 64 holds the stem of valve 64 up against button 65 of diaphragm 66 which is held upward by the water pressure in outlet chamber 60 against the downward bias of spring 67, positioned by screw cap 68 threaded into top 69 of body 70 of regulator 57. Since usually water at about three pounds per square inch is used the screw cap 68 will be moved upwardly until water at three pounds per square inch pressure in outlet chamber 60 will lift diaphragm 66 until spring 63 closes conical valve 64 into valve port 58.

The water to be atomized at water jet 71 by air jet 38 near the drill end of handpiece H is conducted at full source pressure through conduit 56 to regulator 57 where it is reduced in pressure to about three pounds per square inch and delivered through conduits 61, 62, water valve assembly 35, opened and closed by its air activated operator 34, needle valve 53 where its water flow rate is regulated by knob W, and on to jet 71 through conduit 72.

Referring now to the pedal valve mechanism P of FIG. 5, the details of which are shown in FIGS. 6 to 11 inclusive, the mechanism P includes a frame part 75, a valve body part 76, a pedal part 19 and a pedal axle part 20.

Valve body part 76 is sealed to frame part 75 by gasket 77 and secured thereto by screws 78.

Vertical holes 16a, 17a and 18a are sunk into the base of frame part 75 and through gasket 77 as extensions of similar holes 16b, 17b and 18b are formed upwardly into valve body part 76 to form the inlet air chambers 16ab, 17ab and 18ab, for the respective valves 16, 17 and 18. Respective barriers 16c, 17c and 18c separate the inlet chambers 16ab, 17ab and 18ab of valves 16, 17 and 18 from their outlet chamber 16d, 17d and 18d and each of the barriers has its respective valve port 16e, 17e and 18e formed therethrough with its respective valve seat 16f, 17f and 18f formed around the inlet chamber end thereof.

In the respective air inlet spaces 16ab, 17ab and 18ab of each of the valves 16, 17 and 18 are valve disks 16g, 17g and 18g secured to the lower end of its valve stem 16h, 17h and 18h which extends upwardly through its respective valve port with its upper end centrally secured into its respective piston 16i, 17i or 18i sealed by O rings 16j, 17j or 18j for free axial motion along the wall of its respective air outlet chamber 16d, 17d or 18d.

Figure 10:
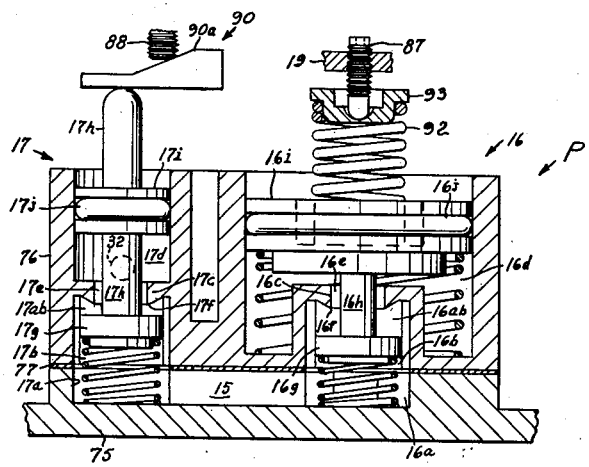
FIG. 10 is a fragmental end elevation in partial section as viewed from the line 10—10 of FIG. 6.

The respective outlet chambers of valves 16, 17 and 18, see FIGS. 9 and 10, are seen to be connected to conduits 21, 32 and 39, see FIGS. 5 and 7.

Now referring particularly to FIGS. 6, 7, 8, 9, 10 and 11, it is seen that the air valve operating lever or pedal 19 of mechanism P is a light weight die cast skeleton covered for appearance sake with a plastic top cover 19a. Depending from the sides of pedal 19 are a pair of bearing bosses 81—81 locating pedal 19 with respect to similar bearing bosses 82—82 upwardly extending from the sides of frame part 75. Pedal axle part 20 rotatably and axially movable coaxially in bearing bosses 81—82 hingedly connects parts 19 and 75. Axle 20 is limited in axial motion by buttons 83—83 secured to the ends thereof by axial screws 84—84. The rotation of pedal 19 about axle 20 is limited in a clockwise direction by abutments 85—85 on parts 19 and 75 and in a counterclockwise direction by the striking of part 19 on the part 75 at 86—86.

Threaded through a cross bar of pedal lever 19 are adjustable operating screws 87, 88 for valves 16 and 17 on one side of axle 20 and stud 89 for operating the valve stem 18h of valve 18 is on the other side of axle 20 so that valves 16 and 17 are opened by moving pedal 19 counterclockwise and valve 18 is opened by moving pedal 19 clockwise.

Note in FIGS. 6, 7 and 11, that a cam roller 90 is mounted freely rotatably on axle 20 but is limited in axial motion on axle 20 by a pair of lock rings 91 set into the surface of axle 20. Cast as part of collar 90 to lay parallel thereto and move therewith is a cam 90a always positioned between stem 18h of valve 17 and pedal lever operating screw 88 for valve 17. When axle 20 is moved to the right, FIG. 11, the low end of cam 90a is between stem 17h and operating screw 88 of valve 17 so that pedal 19 will operate valve 17 with the same delay after screw 87 operates valve 16. However, when axle 20 has been moved to the left, the high end of cam 90a is between stem 17h and operating screw 88 of valve 17 so that pedal 19 will operate valves 16 and 17 simultaneously.

Valve 16 is seen to differ in function from valves 17 and 18 in that when valve 18 is closed, FIG. 9, and pedal 19 is moved in the clockwise direction to touch stud 89 on stem 18h of valve 18, furthers movement of pedal 19 will open valve 18 to pass air under full pressure from conduit 15 to conduit 39 and jet 38 at handpiece H but check valve 37 will prevent high pressure air from conduit 39 from backing into conduit 32. Of course, valve 17 can not be open when valve 18 is open because these valves require opposite movements of pedal 19 away from its neutral position, shown in FIG. 8, to open either of them. When valve 17 is closed and pedal 19 is moved in the counter-clockwise direction to a position when screw 88 of pedal 19 contacts cam 90a and cam 90a is in contact with stem 17h then a further movement of pedal 19 will move valve disk 17g of valve 17 from its seat 17f and full pressure of the air in manifold 15 will immediately appear in conduit 32. But particularly in FIG. 10 it is seen that valve 16 has a resilient compression spring 92 with an end cup 93 interposed between its sealing piston 16i for its outlet air chamber 16d and its operating screw 87 of pedal 19. The effect of interposing spring 92 between piston 16i of valve 16 and its positionable operating screw 87 of pedal 19, see FIG. 10, when it is desired to open valve 16 to admit air under pressure from manifold 15 to conduit 21 and on through filter 22, conduit 28, oiler 23 and conduit 24 to the drill 73 driving turbine in handpiece H, is to require that pedal 19 be moved in the counter-clockwise direction until the pressure of spring 92 on the top side of piston 16i balances the upward pressure of the air on the underside of piston 16i in outlet chamber 16d. Valve 16 is therefore seen to be a modulating valve which will continue to admit air from manifold 15 to outlet chamber 16d and conduit 21 until the admitted air balances the pressure of spring 92 at whatever pressure it is positioned by pedal 19.

In résumé, the present invention provides a group of three pneumatic circuits each with its required conduits, functional accessories, and pedal operated pneumatic valves selectively operated by movement of a common pedal.

One of said pneumatic circuits, see FIGS. 1, 3, 3a, 5 and 5a, includes pressure modulating valve 16 which receives air from manifold 15 at a pressure above atmosphere, modulates the pressure of the air in response to the angular position of pedal 19 from its position of beginning to open valve 16 and advances the air at modulated pressure through conduit 21, air filter 22, conduit 28, air oiler 23 and conduit 24 to the air turbine in handpieces H which drives drill 73. After driving and oiling the turbine the spent and dirty air returns to atmosphere through conduit 25 at blotter 26 where the oil is dropped from the exhausting air.

A second pneumatic circuit, see FIGS. 1, 3, 3a, 5 and 5a, includes on and off valve 17 which, at a time delay determined by the transverse position of axle 20 and collar cam 90a with respect to operating screw 88 of valve 17, see FIG. 6, will be opened by pedal 19 following the start of opening of valve 16 by pedal 19. The opening of valve 17 places manifold 15 in connection with conduit 32 which divides at 33 as shown in FIG. 1 and passes air to air pressure actuated operator 34 of water valve assembly 35 to admit water under about three pounds pressure through conduit 56, water filter 57, valve 35, needle valve assembly 54 and conduit 72 to air jet 71. At the same time air from conduit 32 at 33 passes through needle valve 36 and check valve 37 on its way to air jet 38 through conduit 39.

It is again noted that whenever pedal 19 is moved counter-clockwise from its position of rest, shown in FIG. 8, at a starting position determined by the spring rate of spring 92, the under area of piston 16*i* and the air pressure in outlet chamber 16*d* of valve 16, valve 16 will open to start the air turbine to run drill 73 which thereafter will run at a speed responsive to the position of pedal 19 counter-clockwise of its starting position. And it should be noted that one or the other of the buttons 83 at opposite ends of axle 20 can be moved inwardly by lateral pressure of the dentist's foot to adjust the time of operation of valve 17 which starts air and water jets 38 and 71 with respect to the time of opening of valve 16 which starts the rotation of the drill 73. While valve 17 controls the admission or exclusion of air to or from conduit 32 the further use of this air when it is admitted to conduit 32 is controlled by needle valves 37 and 54. When both needle valves 37 and 54 are closed, valve 17 is ineffective to supply air to jet 38 or water to jet 71 or closing needle valve 37 prevents the flow of air to jet 38 while closing needle valve 54 prevents the flow of water to jet 71. It is seen that needle valves 37 and 54 can be preset so that when valve 17 is opened the fluid jet condition may be that only jet 38 will be open and emitting air at a preset rate or only jet 71 will be open and emitting water at a preset rate or the preferred condition will be when jet 71 is open and emitting water at a preset rate and jet 38 is open and inducing the water from jet 71 to mix therewith to form a common jet of air atomized water or a mist over the drilling area of the tooth. Since it is now found that using the mist is the most effective way of cooling the drill and drilling area without cold shocking the tooth nerve and also for keeping the mouth and especially the drilling area clear of dust and sludge, the equipment will commonly be left with needle valves 37 and 54 adjusted to form the mist of the relative amounts of air and water preferred by the user so that these preferred conditions will immediately be set up whenever the user picks up his work.

The third and final one of the group of three pneumatic circuits provided by the present invention includes an on and off valve 18 substantially like valve 17 but in a much simpler circuit functionally than the second circuit described above. This third circuit is used only to air clean and dry the drilling area for inspection only before or after the second circuit is used simultaneously with the first circuit for their above described functions.

Remembering that the first circuit of valve 16 and the second circuit of valve 17 can only be operated by moving pedal 19 in a counter-clockwise direction from its position of closure of all three valves 16, 17 and 18, as shown in FIG. 8, it is seen that for the purpose of using the air jet 38 only when the drill 73 and water jet 71 are not in use, valve 18 is located on the opposite side of axle 20 of pedal 19 from valves 16 and 17, see FIGS. 16 and 17. Then to operate the third circuit with absolute assurance that neither of valves 16 or 17 will be open but that valve 18 will be open, the user without looking thereat can use his foot to rock pedal 19 clockwise about axle 20 until the limit stops 85 are in contact which assures him that stud 89 of pedal 19 will have struck stem 18*h* and open valve 18 to pass air under pressure from manifold 15 directly to conduit 39 and jet 38.

Having recited some of the objects of my invention, illustrated and described a preferred way in which my invention may be practiced, and described its operation, I claim:

1. A system substantially as described for controlling the operation of an ultra high speed air turbine driven dental drill, said system including in combination a handpiece for rotatably supporting a dental drill, an air turbine within said handpiece for driving said drill, air jet means supported on said handpiece for projecting a jet of air at the burr end of said drill outside said handpiece, water jet means supported on said handpiece adjacent said air jet means for projecting a jet of water at the burr end of said drill outside said handpiece, a source of air under a sufficient pressure to drive said turbine or atomize said jet of water, a source of water under a sufficient pressure to cool or clean the teeth being worked on by said drill, a first air conduit connecting said turbine to said source of air, a water conduit connecting said water jet means to said source of water, water under pressure from said source thereof to said water jet means, a second air conduit for conducting air under pressure from said source thereof to said air jet means, a third air conduit for conducting air under pressure from said source to said second air conduit, said water conduit including in series between said source of water and said water jet means an adjustable water valve for setting the rate of flow of water therethrough and an on and off water valve for starting and stopping the flow of water therethrough, said third air conduit including in series between said source of air and said second air conduit an adjustable air valve for setting the rate of flow of air therethrough and a check valve to prevent any return flow of air from said second air conduit to said third air conduit, said first air conduit between said source of air and said air turbine including a filter for said air, means for putting oil in said air to oil said turbine and a lever operated reaction type air pressure modulating valve to increase the air pressure at said turbine and the speed of said drill in response to the movement in one direction of said lever, said second air conduit including between its junction with said third air conduit and said air source an on and off air valve operable in response to movement in the other direction of said lever when said modulating valve is closed to admit air under pressure from said source to said air jet means.

2. The control system of claim 1, in which said on and off water valve in said water conduit for starting and stopping the flow of water therethrough includes an air pressure actuated operator therefor and said air pressure actuated operator includes means forming an actuating air chamber for said on and off water valve connected with said third air conduit between said source of air and said adjustable air valve for setting the rate of flow of air to said air jet.

3. The control system of claim 2, in which said third air conduit includes between its source of air and its connection with said actuating air chamber of said air operator for said on and off water valve of said water conduit an on and off air valve operable in response to a preset movement in said one direction of said lever to connect said third air conduit to said source of air.

4. The control system of claim 3 including a supporting structure for said lever and said three lever actuated valves for controlling the flow of air from said source of air under pressure to said respective first, second and third air conduits, said structure including axle means rotatably supporting said lever in a neutral position of rest at which each of said three lever actuated valves are closed.

5. The system of claim 4 including resilient means interposed between said lever and said air pressure modulating valve in said first air conduit to open said first air conduit to said air source on a sufficient movement of said lever in said one direction from said neutral position and thereafter to increase the pressure of air admitted to said first air conduit in response to movement of said lever in said one direction from said neutral position.

6. The system of claim 5, including rigid cam means insertable progressively between said lever and said on and off air valve in said third air conduit to preset the position of said lever in said one direction of movement from its said neutral position at which said third air conduit is opened to said air source, simultaneously to admit air to said air jet means as controlled by said air rate of flow control valve in said third air conduit and to admit water to said water jet means as controlled by said water rate of flow control valve in said water conduit, said respective air and water rate control valves being each independently adjustable between its all on and all off position whereby when air is admitted from said air source to said third air conduit said air jet only may be actuated or said water jet only may be actuated or both said jets may be actuated together to provide an air atomized water mist jet of a predetermined rate of flow.

7. The system of claim 6 in which said lever and said on and off air valve in said second air conduit include cooperating abutment means adapted on a sufficient movement of said lever in said other direction from its neutral position to admit air from said source of air to said air jet through said second air conduit while both said first and third air conduits are closed off from said source of air by said other two lever operated valves.

References Cited in the file of this patent
UNITED STATES PATENTS

| | | |
|---|---|---|
| 2,180,993 | Monnier | Nov. 21, 1939 |
| 2,542,833 | Page | Feb. 20, 1951 |
| 2,551,458 | Page | May 1, 1951 |
| 2,855,672 | Franwick et al. | Oct. 14, 1958 |